(12) United States Patent
Holtzapple

(10) Patent No.: US 12,011,680 B2
(45) Date of Patent: Jun. 18, 2024

(54) MINERAL RECOVERY FROM CONCENTRATED BRINES

(71) Applicant: THE TEXAS A&M UNIVERSITY SYSTEM, College Station, TX (US)

(72) Inventor: Mark Holtzapple, College Station, TX (US)

(*) Notice: Subject to any disclaimer, the term of this patent is extended or adjusted under 35 U.S.C. 154(b) by 0 days.

(21) Appl. No.: 17/478,932

(22) Filed: Sep. 19, 2021

(65) Prior Publication Data

US 2022/0249983 A1  Aug. 11, 2022

Related U.S. Application Data

(60) Provisional application No. 63/080,742, filed on Sep. 20, 2020.

(51) Int. Cl.
| | | |
|---|---|---|
| B01D 17/06 | (2006.01) | |
| B01D 9/00 | (2006.01) | |
| B01D 15/36 | (2006.01) | |
| B01D 17/04 | (2006.01) | |
| C01D 3/06 | (2006.01) | |
| C02F 1/04 | (2023.01) | |
| C02F 1/52 | (2023.01) | |
| C02F 1/463 | (2023.01) | |

(52) U.S. Cl.
CPC .......... *B01D 17/06* (2013.01); *B01D 9/0018* (2013.01); *B01D 15/362* (2013.01); *B01D 17/047* (2013.01); *C01D 3/06* (2013.01); *C02F 1/041* (2013.01); *C02F 1/52* (2013.01); *C02F 1/463* (2013.01); *C02F 2001/5218* (2013.01)

(58) Field of Classification Search
CPC ....... B01D 9/0018; B01D 17/06; C02F 1/041; C02F 1/463; C02F 2001/5218
See application file for complete search history.

(56) References Cited

U.S. PATENT DOCUMENTS

| | | | |
|---|---|---|---|
| 3,350,292 A | | 10/1967 | Weinberger et al. |
| 3,965,001 A | | 6/1976 | Irani et al. |
| 5,059,332 A | * | 10/1991 | Satoh ...................... B01D 17/02 |
| | | | 134/28 |
| 8,658,014 B2 | | 2/2014 | Bjornen |
| 9,580,343 B2 | * | 2/2017 | Keister ................... C01D 3/06 |
| 2015/0315055 A1 | * | 11/2015 | Chidambaran ......... E21B 43/40 |
| | | | 166/266 |

OTHER PUBLICATIONS

International Search Report dated Mar. 24, 2022 for PCT/US2021/051008.

* cited by examiner

*Primary Examiner* — Renee Robinson

(57) ABSTRACT

The present disclosure is directed to a new and improved separation process that isolates individual minerals from brines containing a mixture of minerals. The brines may be derived from seawater, brackish water, oilfield brines, solution mining, mine run-off, and other sources. Typically, the minerals are recovered as chlorides using a variety of processing steps including evaporation, centrifugation, elutriation, filtration, electrocoagulation, crystallization, adsorption, and chromatography.

26 Claims, 15 Drawing Sheets

Major ion composition of seawater (mg/L)   (parts per million)

| | Typical Seawater | Eastern Mediterranean | Arabian Gulf at Kuwait | Red Sea at Jeddah |
|---|---|---|---|---|
| Chloride (Cl⁻) | 18,980 | 21,200 | 23,000 | 22,219 |
| Sodium (Na⁺) | 10,556 | 11,800 | 15,850 | 14,255 |
| Sulfate (SO₄²⁻) | 2,649 | 2,950 | 3,200 | 3,078 |
| Magnesium (Mg²⁺) | 1,262 | 1,403 | 1,765 | 742 |
| Calcium (Ca²⁺) | 400 | 423 | 500 | 225 |
| Potassium (K⁺) | 380 | 463 | 460 | 210 |
| Bicarbonate (HCO₃⁻) | 140 | | 142 | 146 |
| Strontium (Sr²⁺) | 13 | | | |
| Bromide (Br⁻) | 65 | 155 | 80 | 72 |
| Borate (BO₃³⁻) | 26 | 72 | | |
| Fluoride (F⁻) | 1 | | 1.5 | |
| Silicate (SiO₃²⁻) | 1 | | | |
| Iodide (I⁻) | <1 | 2 | | |
| Others | | | | |
| Total dissolved solids (TDS) | 34,483 | 38,600 | 45,000 | 41,000 |

Source: Magazine - Water Condition & purification, January 2005

*FIG. 12*

| Element | Atomic Weight | ppm | Element | Atomic Weight | ppm |
|---|---|---|---|---|---|
| Hydrogen H2O | 1.008 | 110,000 | Molybdenum Mo | 0.09594 | - |
| Oxygen H2O | 15.999 | 883,000 | Ruthenium Ru | 101.07 | 0.01 |
| Sodium NaCl | 22.989 | 10,800 | Rhodium Rh | 102.905 | 0.0000007 |
| Chlorine NaCl | 35.453 | 19,400 | Palladium Pd | 106.4 | - |
| Magnesium Mg | 24.312 | 1,290 | Argentum (silver) Ag | 107.87 | 0.00028 |
| Sulfur S | 32.064 | 904 | Cadmium Cd | 112.4 | 0.00011 |
| Potassium K | 39.102 | 392 | Indium In | 114.82 | - |
| Calcium Ca | 10.080 | 411 | Stannum (tin) Sn | 118.69 | 0.00081 |
| Bromine Br | 79.909 | 67.3 | Antimony Sb | 121.75 | 0.00033 |
| Helium He | 4.0026 | 0.0000072 | Tellurium Te | 127.6 | - |
| Lithium Li | 6.94 | 0.17 | Iodine I | 166.904 | 0.064 |
| Beryllium Be | 9.0133 | 0.0000006 | Xenon Xe | 131.3 | 0.000047 |
| Boron B | 10.811 | 4.45 | Cesium Cs | 132.905 | 0.0003 |
| Carbon C | 12.011 | 28 | Barium Ba | 137.34 | 0.021 |
| Nitrogen ion | 14.007 | 15.5 | Lanthanum La | 138.91 | 0.0000029 |
| Fluorine F | 18.998 | 13 | Cerium Ce | 140.12 | 0.0000012 |
| Neon Ne | 20.183 | 0.00012 | Praesodymium Pr | 140.907 | 0.00000064 |
| Aluminium Al | 26.982 | 0.001 | Neodymium Nd | 144.24 | 0.0000028 |
| Silicon Si | 28.086 | 2.9 | Samarium Sm | 150.35 | 0.00000045 |
| Phosphorus P | 30.974 | 0.088 | Europium Eu | 151.96 | 0.0000013 |
| Argon Ar | 39.948 | 0.45 | Gadolinium Gd | 157.25 | 0.0000007 |
| Scandium Sc | 44.956 | <0.000004 | Terbium Tb | 158.924 | 0.00000014 |
| Titanium Ti | 47.9 | 0.001 | Dysprosium Dy | 162.5 | 0.00000091 |
| Vanadium V | 50.942 | 0.0019 | Holmium Ho | 164.93 | 0.00000022 |
| Chromium Cr | 51.996 | 0.0002 | Erbium Er | 167.26 | 0.00000087 |
| Manganese Mn | 54.938 | 0.0004 | Thulium Tm | 168.934 | 0.00000017 |
| Ferrum (Iron) Fe | 55.847 | 0.0034 | Ytterbium Yb | 173.04 | 0.00000082 |
| Cobalt Co | 58.933 | 0.00039 | Lutetium Lu | 174.97 | 0.00000015 |
| Nickel N | 58.71 | 0.0066 | Hafnium Hf | 178.49 | <0.000008 |
| Copper Cu | 63.54 | 0.0009 | Tantalum Ta | 180.948 | <0.0000025 |
| Zinc Zn | 65.37 | 0.005 | Tungsten W | 183.85 | < 0.000001 |
| Gallium Ga | 69.72 | 0.00003 | Rhenium Re | 186.2 | 0.0000084 |
| Germanium Ge | 72.59 | 0.00006 | Osmium Os | 190.2 | - |
| Arsenic As | 74.922 | 0.0026 | Iridium Ir | 192.2 | - |
| Selenium Se | 78.96 | 0.0009 | Platinum Pt | 195.09 | 0.000011 |
| Krypton Kr | 83.8 | 0.00021 | Aurum (gold) Au | 196.967 | 0.00015 |
| Rubidium Rb | 85.47 | 0.12 | Mercury Hg | 200.59 | - |
| Strontium Sr | 87.62 | 8.1 | Thallium Tl | 204.37 | 0.00003 |
| Yttrium Y | 88.905 | 0.000013 | Lead Pb | 207.19 | 0.00002 |
| Zirconium Zr | 91.22 | 0.000026 | Bismuth Bi | 208.98 | 0.0000004 |
| Niobium Nb | 92.906 | 0.000015 | Thorium Th | 232.04 | 0.0033 |
| | | | Uranium U | 238.03 | - |
| | | | Plutonimu Pu | (244) | - | https://oceanplasma.org/documents/chemistry.html

*FIG. 13*

| | Group I Alkali Metals | | | | Group II Alkaline Earth Metals | | | | Transition Metals | | | | Post-Transition Metals | |
|---|---|---|---|---|---|---|---|---|---|---|---|---|---|---|
| | Ammonium $NH_4^+$ | Lithium $Li^+$ | Sodium $Na^+$ | Potassium $K^+$ | Magnesium $Mg^{2+}$ | Calcium $Ca^{2+}$ | Barium $Ba^{2+}$ | Iron (II) $Fe^{2+}$ | Iron (III) $Fe^{3+}$ | Copper (II) $Cu^{2+}$ | Silver $Ag^+$ | Zinc $Zn^{2+}$ | Lead (II) $Pb^{2+}$ | Aluminum $Al^{3+}$ |
| Fluoride $F^-$ | soluble | slightly soluble | soluble | soluble | insoluble | insoluble | slightly soluble | slightly soluble | slightly soluble | soluble | soluble | soluble | insoluble | slightly soluble |
| Chloride $Cl^-$ | soluble | soluble | soluble | soluble | soluble | soluble | soluble | soluble | soluble | soluble | insoluble | soluble | insoluble | soluble |
| Bromide $Br^-$ | soluble | soluble | soluble | soluble | soluble | soluble | soluble | soluble | soluble | soluble | insoluble | soluble | slightly soluble | soluble |
| Iodide $I^-$ | soluble | soluble | soluble | soluble | soluble | soluble | soluble | soluble | | | insoluble | | insoluble | soluble |
| Chlorate $ClO_3^-$ | soluble | soluble | soluble | soluble | soluble | soluble | soluble | soluble | soluble | | soluble | | | soluble |
| Hydroxide $OH^-$ | — | soluble | soluble | soluble | insoluble | slightly soluble | slightly soluble | insoluble | insoluble | insoluble | slightly soluble | insoluble | insoluble | insoluble |
| Sulfite $SO_3^{2-}$ | soluble | soluble | soluble | soluble | soluble | insoluble | insoluble | soluble | soluble | soluble | insoluble | insoluble | insoluble | |
| Sulfate $SO_4^{2-}$ | soluble | soluble | soluble | soluble | soluble | slightly soluble | insoluble | soluble | | soluble | slightly soluble | soluble | insoluble | soluble |
| Carbonate $CO_3^{2-}$ | soluble | soluble | soluble | soluble | insoluble | insoluble | insoluble | insoluble | | insoluble | insoluble | insoluble | insoluble | |
| Nitrite $NO_2^-$ | soluble | soluble | soluble | soluble | soluble | soluble | soluble | soluble | soluble | soluble | insoluble | soluble | soluble | |
| Nitrate $NO_3^-$ | soluble | soluble | soluble | soluble | soluble | soluble | soluble | soluble | soluble | soluble | soluble | soluble | soluble | soluble |
| Phosphate $PO_4^{3-}$ | soluble | insoluble | soluble | soluble | insoluble | insoluble | insoluble | insoluble | insoluble | insoluble | insoluble | insoluble | insoluble | insoluble |

*FIG. 14*

| Comparison of Cavity Size with Effective Ion Radii of Alkali metals | | | |
|---|---|---|---|
| Crown Ether | Cavity Size/Å | Favored Alkali Ion | Effective Ion Radii/Å |
| 12-crown-4 | 0.6–0.75 | Li$^+$ | 0.76 |
| 15-crown-5 | 0.86–0.92 | Na$^+$ | 1.02 |
| 18-crown-6 | 1.34–1.55 | K$^+$ | 1.38 |
| 21-crown-7 | 1.7–2.1 | Cs$^+$ | 1.67 |

Selective binding of cations to crown ethers [6]

FIG. 15

| | Density (g/cm$^3$) | Ref | Melting point (°C) | Ref |
|---|---|---|---|---|
| MgCl$_2$·6 H$_2$O | 1.569 | [1] | 117 | [1] |
| KCl·MgCl$_2$·6 H$_2$O | 1.598 | [2] | 167 | [5] |
| KCl | 1.984 | [3] | | |
| NaCl | 2.17 | [4] | | |
| MgCl$_2$ | 2.32 | [1] | | |

Key properties of salts.

FIG. 16

MINERAL RECOVERY FROM CONCENTRATED BRINES

RELATED APPLICATIONS/PRIORITY

This application claims priority to U.S. Provisional Application No. 63/080,742 (filed on Sep. 20, 2020). The Application incorporates this Provisional Application by reference herein for all purposes.

TECHNICAL FIELD

This disclosure is generally directed to brines. More specifically, this disclosure is directed to mineral recovery from concentrated brines.

BACKGROUND

The recovery of potable water from seawater, brackish water, or oilfield brine produces a concentrated brine containing a mixture of minerals. Disposal of these brines can be expensive or environmentally damaging; however, if individual minerals can be separated from the brines, then positive economic value can be realized.

Similarly, solution mining is used to recover a desired mineral from underground resources. Typically, the desired mineral is mixed with less desired minerals, so separation is required to achieve positive economic value.

Mine run-off is a source of pollution; however, valuable minerals can be contained within the run-off stream. Their recovery creates positive economic value and helps fund clean-up of the environmental problem.

SUMMARY OF THE DISCLOSURE

The present disclosure is directed to a new and improved separation of individual minerals from brines containing a mixture of minerals. The brines may be derived from seawater, brackish water, oilfield brines, solution mining, mine run-off, and other sources. Typically, the minerals are recovered as chlorides using a variety of processing steps including evaporation, centrifugation, elutriation, filtration, electrocogulation, crystallization, adsorption, and chromatography.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

BRIEF DESCRIPTION OF THE DRAWINGS

For a more complete understanding of this disclosure and its features, reference is now made to the following description, taken in conjunction with the accompanying drawings, in which:

FIG. 12 is a table that shows the dominant mineral components in seawater from a variety of sources.

FIG. 13 is a table shows the elemental composition of "typical" seawater.

FIG. 14 is a table that shows the solubility of various combinations of cations and anions.

FIG. 15 is a table that shows the selective binding of cations to crown ethers.

FIG. 16 is a table that shows the key properties of salt.

DETAILED DESCRIPTION

The figures described below, and the various embodiments used to describe the principles of the present disclosure in this patent document are by way of illustration only and should not be construed in any way to limit the scope of the disclosure. Those skilled in the art will understand that the principles of the present disclosure invention may be implemented in any type of suitably arranged device or system. Additionally, the drawings are not necessarily drawn to scale.

This disclosure provides methods by which brines can be separated into individual components that are more valuable than the mixture.

FIG. 12 is a table that shows the dominant mineral components in seawater from a variety of sources. The dominant cations are sodium, magnesium, calcium, and potassium. The dominant anion is chloride, with lesser amounts of sulfate and bicarbonate, and minor amounts of bromide, borate, silicate, and fluoride.

FIG. 13 is a table that shows the elemental composition of "typical" seawater. Oxygen and hydrogen are predominantly present in the form of water.

FIG. 14 is a table that shows the solubility of various combinations of cations and anions. Generally, chlorides of almost all cations are soluble. In contrast, generally the hydroxides of transition and post-transition metals are insoluble or slightly soluble. This property can be exploited to aid separation.

Figure 1:
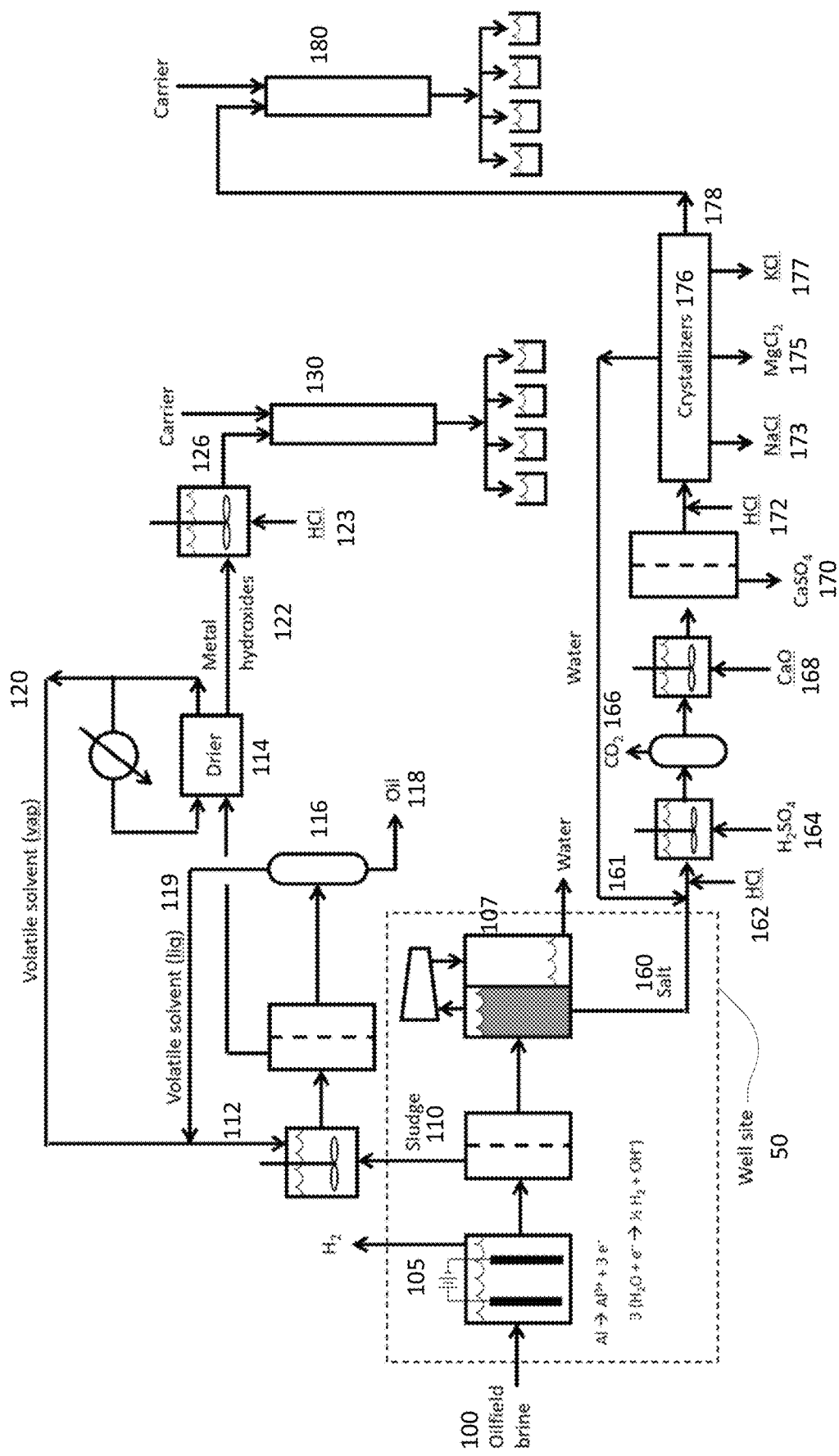
FIG. 1 shows a process where electrocoagulation pretreats oilfield brine prior to entering vapor-compression evaporation. The minerals are separated into two streams that are transported separately from the well site and are further processed to separate minerals into individual components.

FIG. 1 shows a process for desalinating oilfield brine 100, or similar brines from other sources. Certain processes described herein are described as being carried out at a well site 50; however, the processes may be carried out a variety of locations. This disclosure of particular processes occurring at particular locations should not be interpreted as the only location at which such processes should occur. In particular configurations, a central processing facility may process concentrated salts from multiple well sits.

With reference to FIG. 1, first, the brine 100 is treated with electrocoagulation 105. The anode is sacrificial and is typically made from aluminum or iron. Yet others may be utilized. The cathode is non-sacrificial, and typically is made from stainless steel. The cathode produces hydroxide ions and hydrogen gas. The anode creates cations; for example, aluminum metal creates $Al^{3+}$. The hydroxide of the cation is insoluble, so it precipitates and entraps organic contaminants in the flocs. In addition, other insoluble hydroxides (e.g., lead, arsenic) precipitate as well. The flocs of insoluble metal hydroxides with entrapped organics is termed "sludge" 110 and is removed from the aqueous stream using a filter, or some other suitable device. The sludge has value minerals and oil. In particular configurations, the oilfield brine has one percent oil. In other configurations, it may have more or less percentages oil. While certain process described herein will be described with reference to oilfield brine, disclosure may also be used in other brine scenarios that have no oil. Examples are described with referenced to other figures below.

The clarified aqueous solution is evaporated to remove water. In this example, vapor-compression evaporation 107 is employed to produce crystalized salt or concentrated brine, which is collected separately from the sludge. It should be noted that other evaporators (e.g., multi-effect distillation, multi-stage flash, thermo vapor compression) could be employed as well. In this example, it is assumed the salt is damp solid, not a concentrated aqueous solution. Also, while one stage of vapor-compression evaporation 107 is generally shown, in other configurations more than one stage may be utilized as shown in other figures.

Both the sludge 110 and concentrated salt 160 are transported separately to a facility where each is processed separately. In some configurations, the facility processing the sludge 110 and concentrated salts 160 may be the same. In other configurations, they may be different. As described above, certain facilities may process concentrated solutions from multiple different sites.

The sludge 110 is suspended in a volatile solvent 112 (e.g., but not limited to, hexane) that dissolves entrapped oil from the sludge. Some describe this as a "washing" process. Ideally, the sludge 110 and volatile solvent 112 are contacted in a countercurrent manner, which minimizes the amount of solvent that must contact the sludge to remove a given quantity of oil. The solvent is rich with oil and is sent to a distillation column 116 where the oil 118 (being heavier) is recovered from the bottoms and the volatile solvent 119 is recovered from the top, and hence is recycled and combine with the stream of volatile solvent 120 to form the stream of volatile solvent 112. Again, as referenced earlier, oil can be on the order of one percent of brine. Accordingly, the recovery of the oil 118 has value.

After this separation process, the salts are substantially free of oil but are laden with solvent. Free liquid can be removed using a centrifuge (not shown). The remaining solvent residue is removed using a drier 114 that circulates superheated solvent vapors through a rotating drum partially filled with solvent-laden salt. The solvent exits the drier at saturated, or near-saturated, conditions. Other drier technologies could be employed; this is but one option. The recovered solvent 120 is recycled. The clean salt 122 from the drier consists primarily of insoluble hydroxides that can be converted to soluble chlorides by adding an aqueous solution of hydrochloric acid 123.

The salts 126 may then be sent through ion exchange chromatography 130 to separate different components. Non-limiting examples of things that could be recovered (depending on the brine) include, but are not limited to lead, uranium, cadmium, iron, copper, zinc and others that will become apparent to one of ordinary skill in the art. Yet other examples of separated items are discussed below.

Returning to the vapor-compression evaporation 107, the clean salt 160 recovered from the vapor-compression evaporator is dissolved in water 161 to create an aqueous solution. If necessary, the pH is adjusted to near neutrality using HCl 162. To remove carbonates and bicarbonates, the solution is acidified with sulfuric acid 164 to pH<4.0, which shifts the equilibrium to carbonic acid. Carbonic acid dissociates to water and carbon dioxide 166; the carbon dioxide 166 can be stripped from the solution. To return the pH to near neutrality, lime 168 (CaO or $Ca(OH)_2$) is added. The sulfuric acid reacts to form insoluble calcium sulfate 170 (gypsum). If extreme sulfate removal is desired, barium oxide or barium hydroxide can be added; the resulting sulfate salts are extremely insoluble. The pH is adjusted to near neutrality by adding hydrochloric acid 172.

The major salts (NaCl 173, $MgCl_2$ 175, and KCl 177) are removed in one or more crystallizers 176. Non-limiting examples of crystallizers 176 that can be used are described below with reference to other figures.

Overall, the processes described just prior to the crystallizers 176 for the concentrated salts 160 is to replace the sulfates (which can be a large part of seawater brine) and carbonates with chlorides such that other salts are minimized (if not largely eliminated). Likewise, the calcium is removed. Because calcium sulfate is very insoluble, we can eliminate undesired calcium salts (that would otherwise add complexity to crystallizers) by adding sulfuric acid to the process. With such removal, chloride salts are largely sent to the crystallizers 176. Chlorides are highly soluble. Although this particular configurations shows one example of such sulfate and carbonate removal, other configurations may also be utilized.

The salts from the sludge 126 and the salts 178 in the bittern (sometimes called "mother liquor") exiting the crystallizer has value and can be separated using ion exchange chromatography 130, 180. The cations contained therein may be separated using a variety of known adsorption and chromatographic techniques. Non-limiting example are described below:

Example 1—Crown ethers are known to selectively adsorb cations (table in FIG. 15). Immobilizing crown ethers onto a solid phase allows selective ions to be adsorbed from the aqueous solution.

Example 2—EDTA (ethylenediaminetetraacetic acid) and similar chelating agents may be immobilized onto a solid phase to adsorb cations and remove them from the aqueous solution.

Example 3—Ion exchange resins are used to separate cations. For example, Dionex IonPac CS16 has a high-capacity cation-exchange resin functionalized with carboxylic acid groups that are specifically designed to separate alkali metals and alkaline earth metals [7].

Example 4—Rare earths can adsorb onto ion exchange resins, and then are subsequently selectively eluted by varying the chemistry of the aqueous phase [8].

Example 5—Zeolites have well-controlled pore structures that selectively adsorb cations and can be employed chromatographically.

The above are just a few examples. After having reviewed this specification, one of ordinary skill will recognize that other techniques that may be utilized. As non-limiting examples, the literature is replete with numerous examples of methods for separating cations by adsorption and chromatography, and by selectively manipulating the aqueous phase (chelating agents, solvents, pH, temperature). These methods can be practiced both at laboratory and industrial scales.

Figure 2:
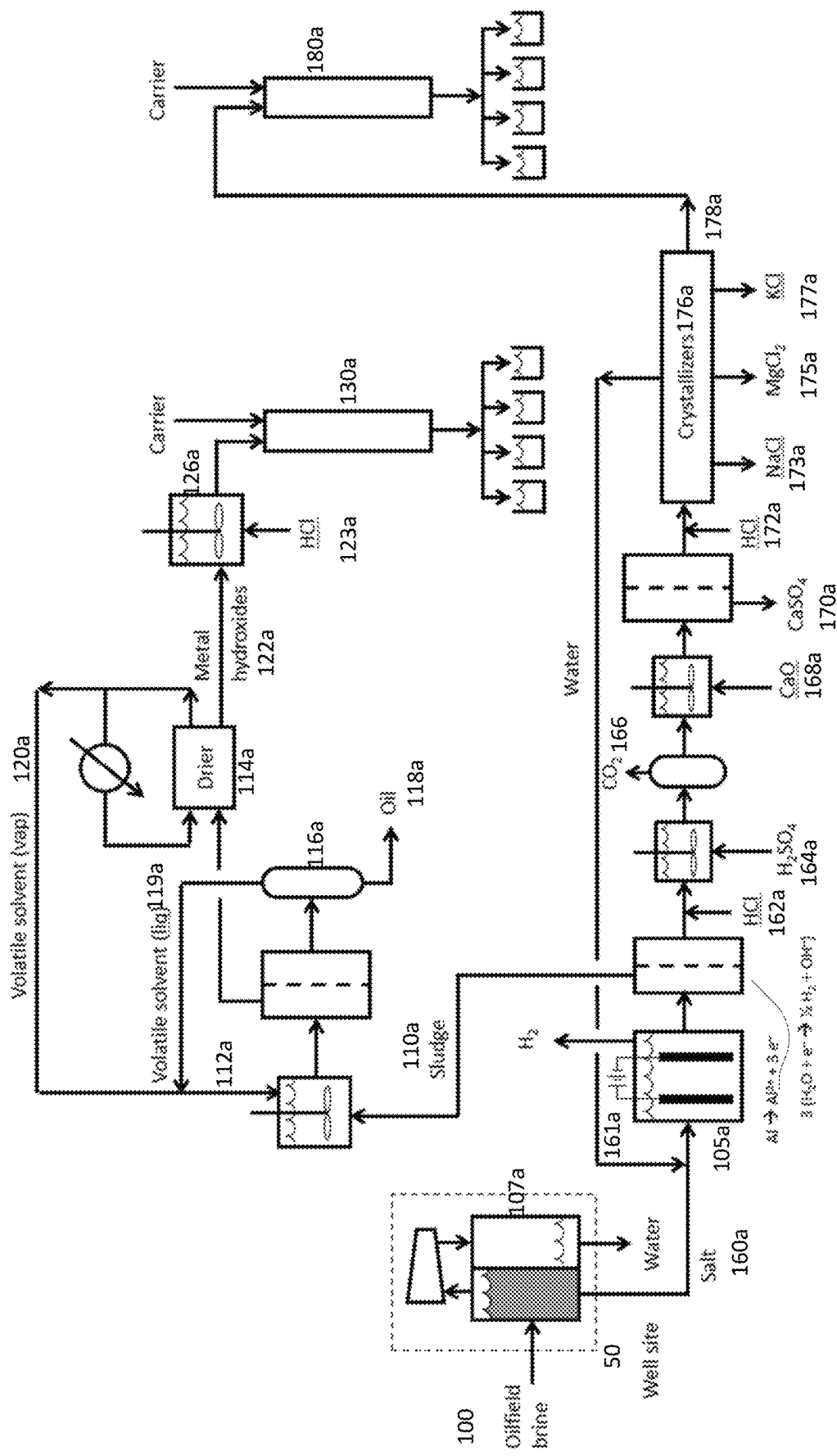
FIG. 2 shows a process where a single stream of minerals is produced from vapor-compression evaporation. The single stream of minerals is transported from the well site and is further processed using electrocogulation to separate minerals into individual components.

FIG. 2 shows a process similar to that shown in FIG. 1. For labeling of similar things with similar numbering indicates operation in a general manner as previously described except that a sub-label (e.g., b, c, d, etc) indicates slight various in operations due to changed components. The principal different between FIG. 2 and FIG. 1 is that that all the salts and oil are removed in a single stream 160*a*, which is assumed to be dry or damp. This mixture of materials is brought to a central facility where the salt is re-dissolved in water. The solution is treated with the same steps as previously described.

Figure 3:
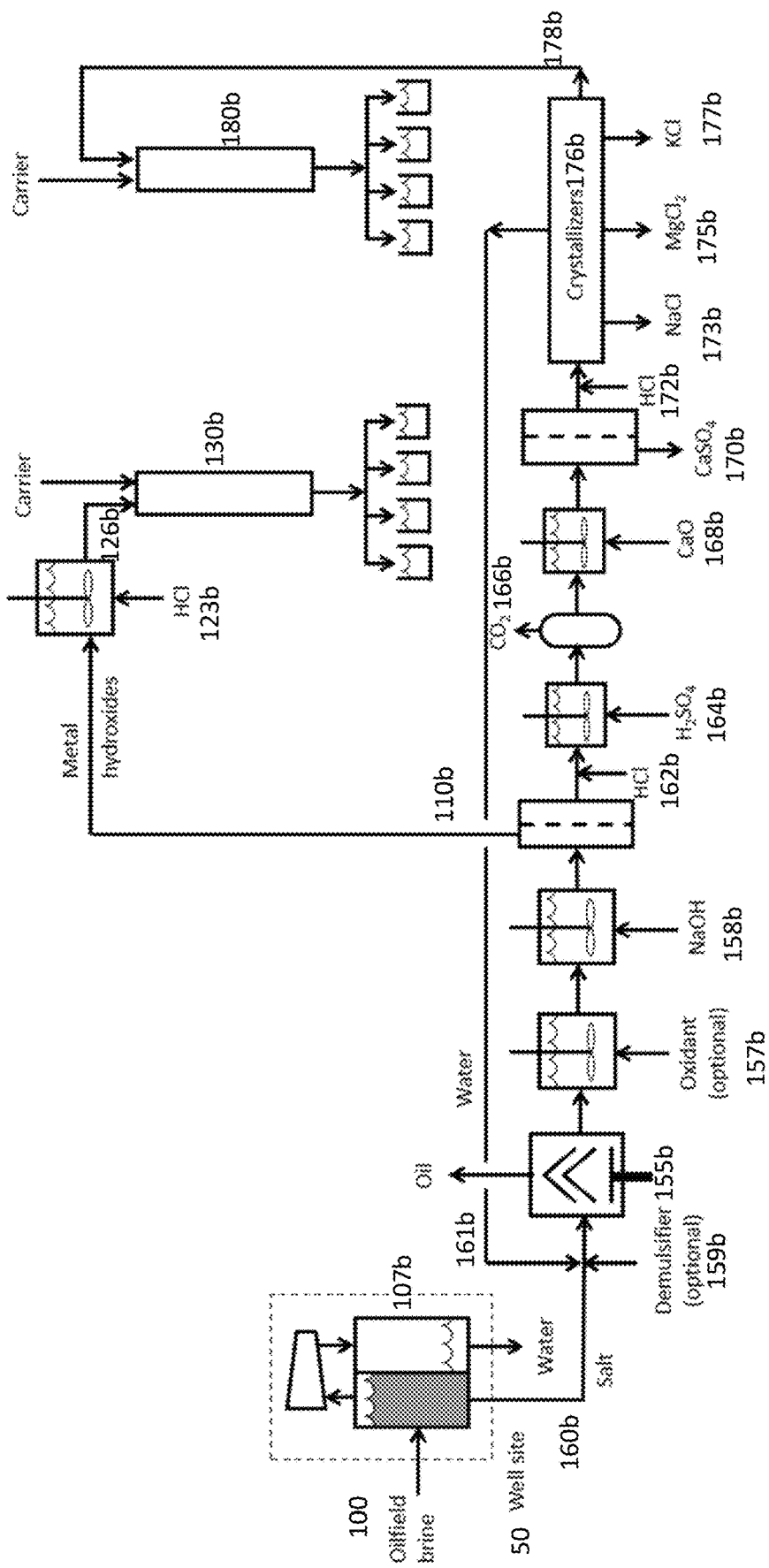
FIG. 3 shows a process similar to FIG. 2, except centrifugation and addition of an alkali replaces electrocoagulation.

FIG. 3 shows a process similar to that shown in FIG. 2, except that electrocoagulation is not employed. Instead, oil is removed by a centrifuge 155*b*, or similar settling technology based on liquid density differences. Thus, rather than using an electrical oil separation process, physical process can be used. Optionally, to enhance oil recovery, a demulsifier 159*b* is added to break harmful emulsions. Optionally, to ensure that residual oil is removed from the stream, an oxidant 157*b* is added to destroy residues, which for example, can be in the parts-per-million concentration levels. Examples of such oxidants include ozone, hydrogen peroxide, and hydroxyl free radicals. Oxidation reactions can be promoted using catalysts and UV light. Alternatively (not shown), residual oil can be removed from the water using activated carbon, or other similar adsorbents.

To get the hydroxides (e.g., 110*b*), sodium hydroxide 158*b* is also introduced.

Figure 4:
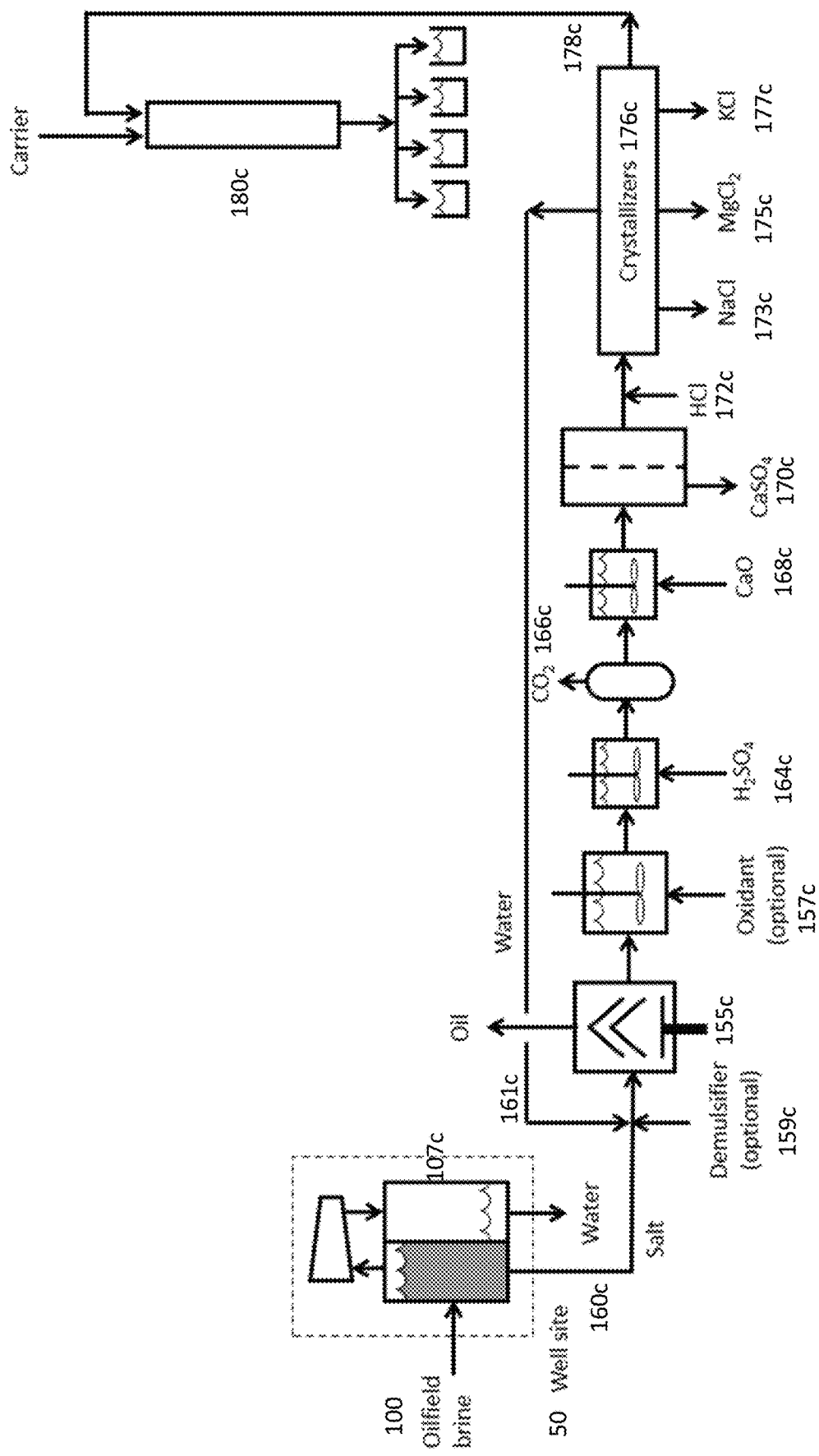
FIG. 4 shows a process similar to FIG. 3, except selective precipitation of insoluble hydroxides is not employed.

As shown in the table in FIG. 15, hydroxides of transition and post-transition metals tend to be insoluble, which can be used as a basis for separation. FIG. 4 shows a process option where this separation technique is eliminated. However, FIG. 4 does include the addition of sulfuric acid to strip carbon dioxide and an alkali (e.g., CaO, BaO) to precipitate sulfate. Because of the alkaline conditions, hydroxide-insoluble metals will precipitate with the sulfate and be discarded.

Figure 5:
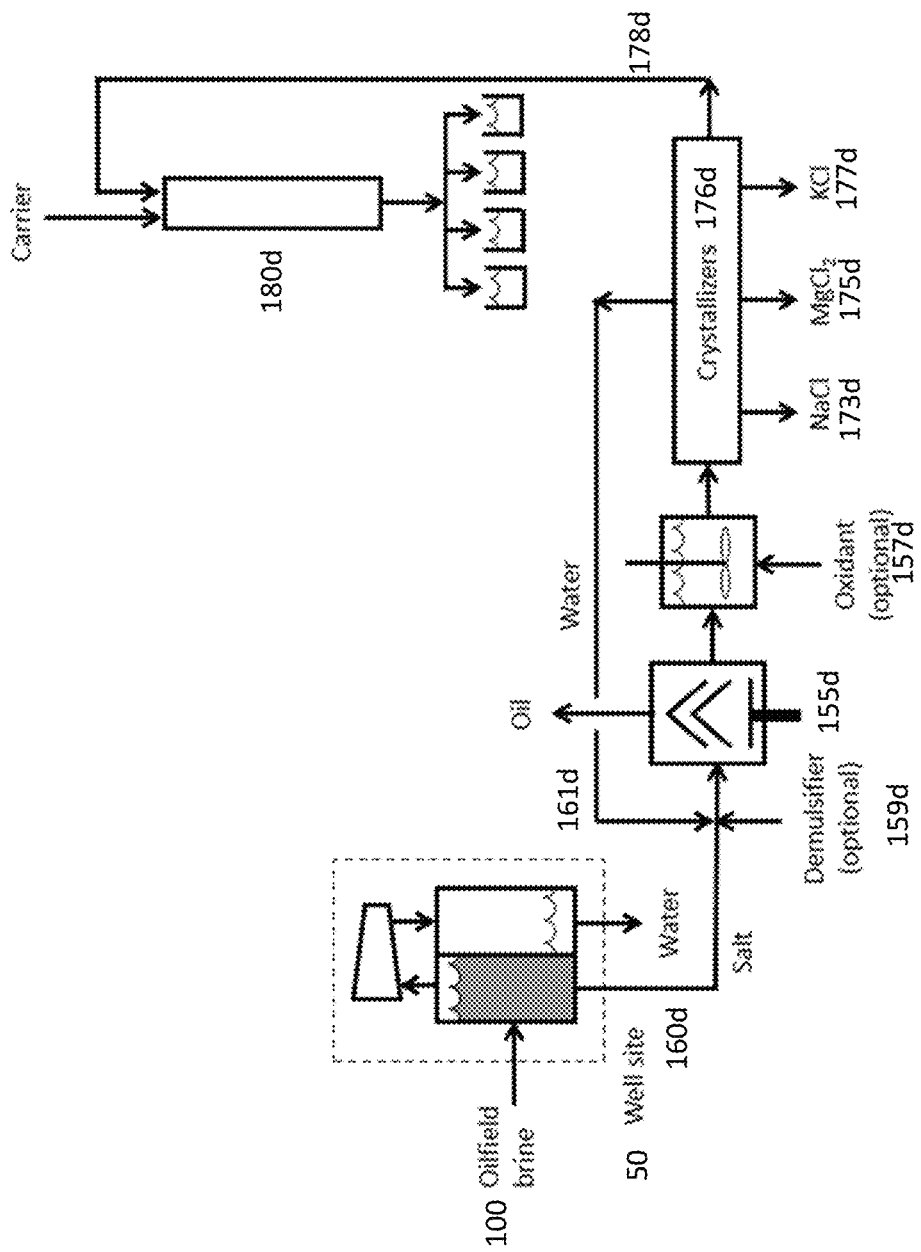
FIG. 5 shows a process similar to FIG. 4, except removal of carbonate, bicarbonate, and sulfate anions is not employed.

To avoid this problem, carbonate, bicarbonate, and sulfate removal can be eliminated (FIG. 5); however, in this process option, the carbonates, bicarbonates, and sulfates will be included with chlorides, which will make downstream separations more complex and products less pure.

Figure 6:
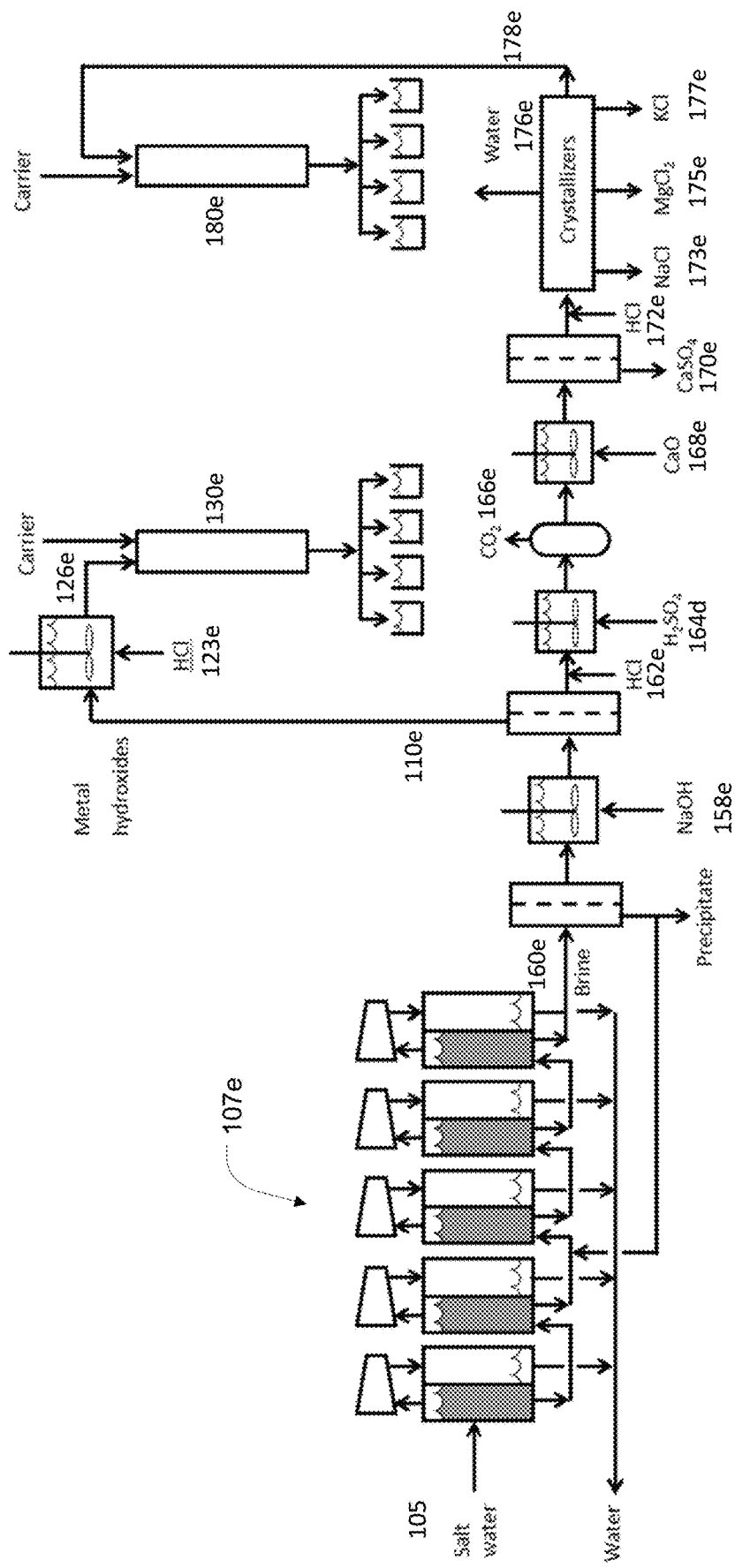
FIG. 6 shows a process where brine is separated into individual mineral components.
Figure 7:
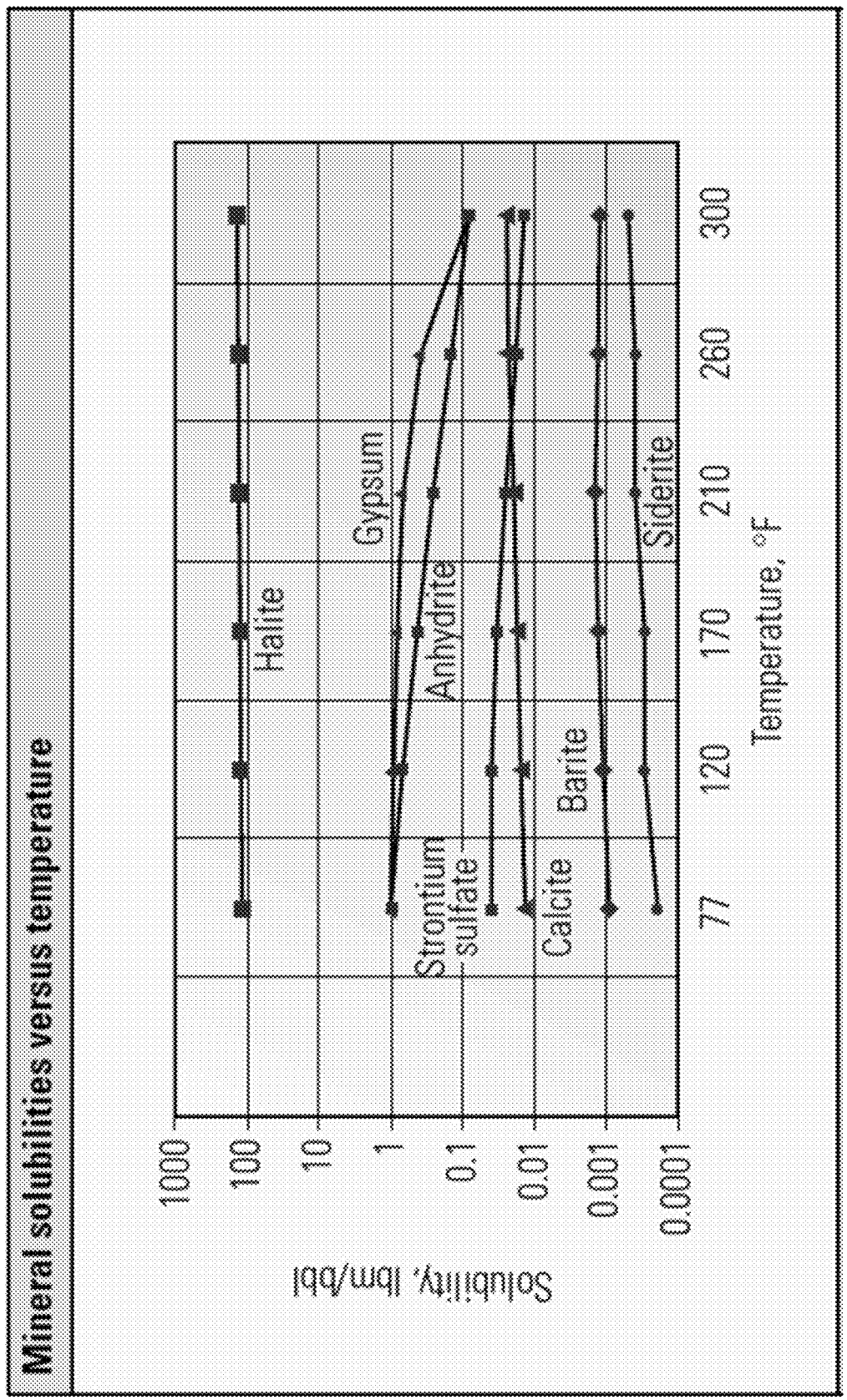
FIG. 7 shows the solubility of minerals typically found in oilfield brine, brackish water, and seawater.

FIG. 6 shows a process in which the feed water 105 (e.g., seawater, brackish water) does not contain oil contaminants. Furthermore, to improve efficiency, multi-stage vapor-compression evaporators 107*e* are employed. As the minerals become more concentrated, low-solubility minerals (FIG. 7) may precipitate and potentially foul heat exchanger surfaces. To prevent such an occurrence, seed crystals are added at locations where the concentrations of low-solubility minerals are nearly saturated. Adding seed crystals promotes precipitation onto the seed crystals rather than the metal surfaces of heat exchangers. Example seed crystals are gypsum (calcium sulfate), strontium sulfate, calcite (calcium carbonate), barite (barium sulfate), and siderite (iron carbonate). Initially, external sources of seed crystals must be secured; however, after the process operates for a while, the enlarged crystals harvested at the end of the process can be recovered by filtration, or some other means, and recycled to the appropriate location where the liquid is becoming saturated with low-solubility minerals.

If additional carbonate, bicarbonate, and sulfate remains in solution, as described previously, the broth can be acidified with sulfuric acid, which allows carbon dioxide to be stripped from the aqueous solution. The sulfate is removed by adding lime (CaO or Ca(OH)$_2$). If extremely low sulfate concentration is desired, BaO or Ba(OH)$_2$ can be added to precipitate sulfates, as described previously.

To promote the separation of transition and post-transition metals, an alkali (sodium hydroxide) can be added. These metals can be re-solubilized by adding hydrochloric acid and separated via adsorption and chromatography, as described previously. The salts that remain in solution are recovered by crystallization, and then via adsorption and chromatography, as described previously.

Figure 8:
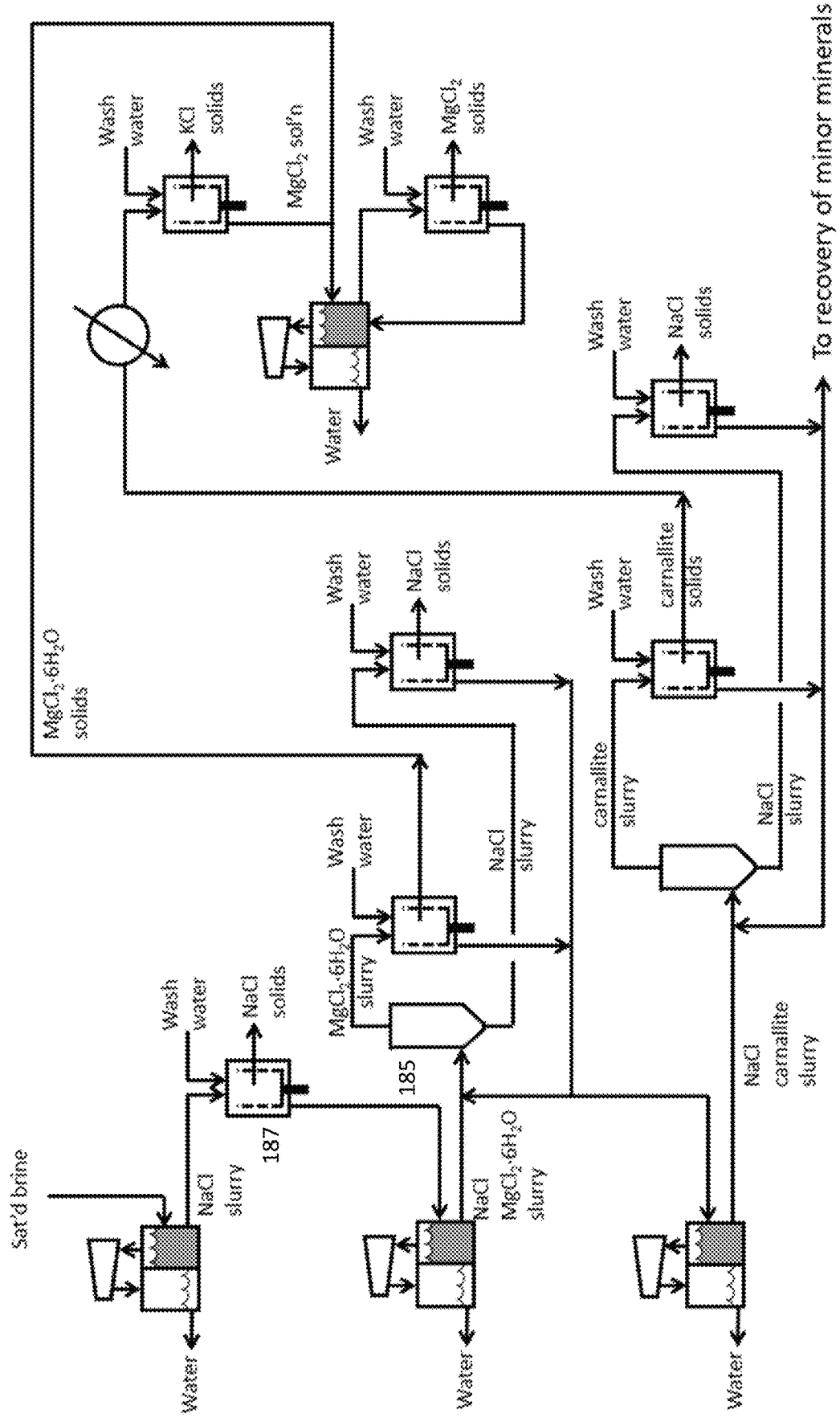
FIG. 8 shows a low-temperature option for crystalizing major salts from a brine mixture.
Figure 9:
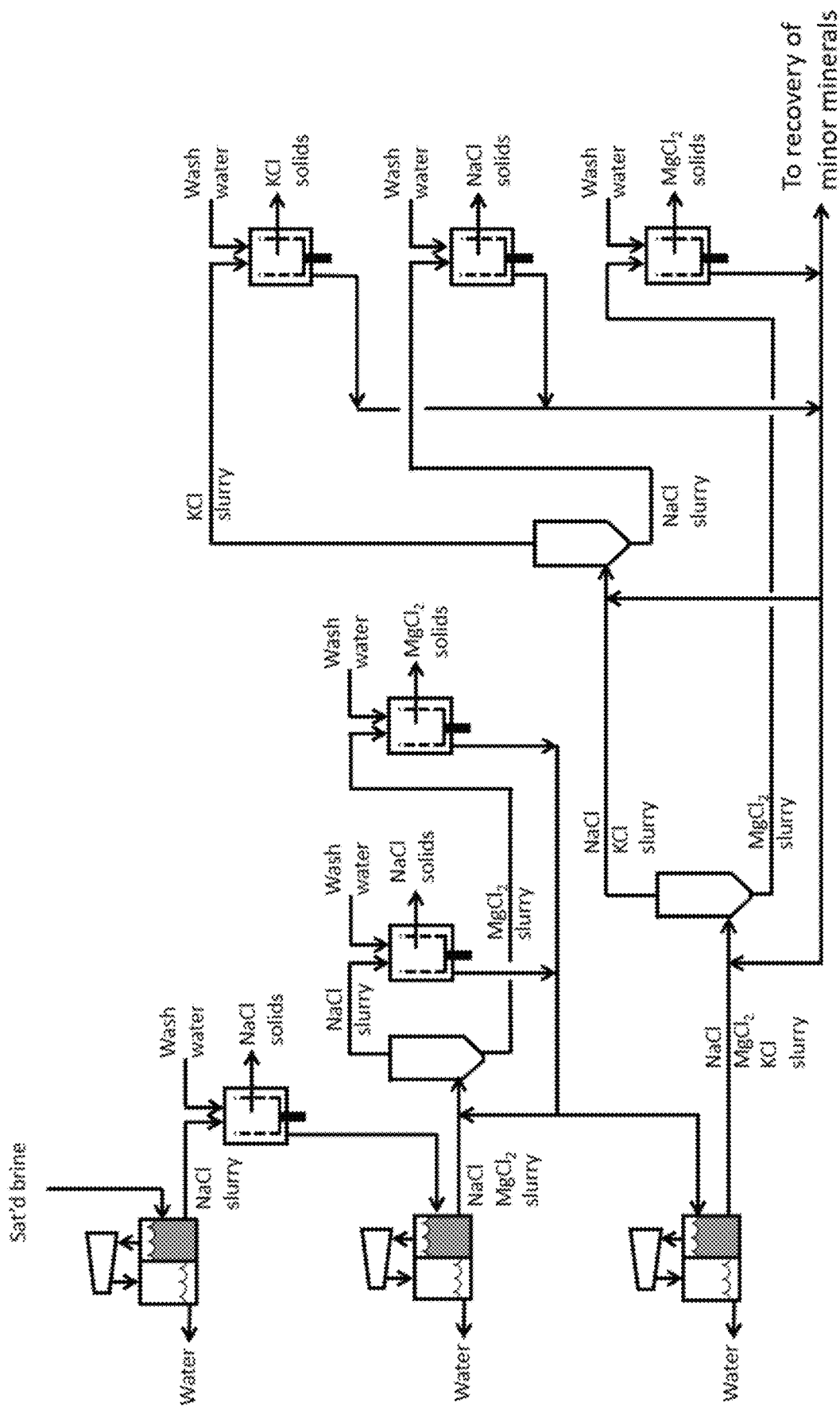
FIG. 9 shows a high-temperature option for crystalizing major salts from a brine mixture.
Figure 10:
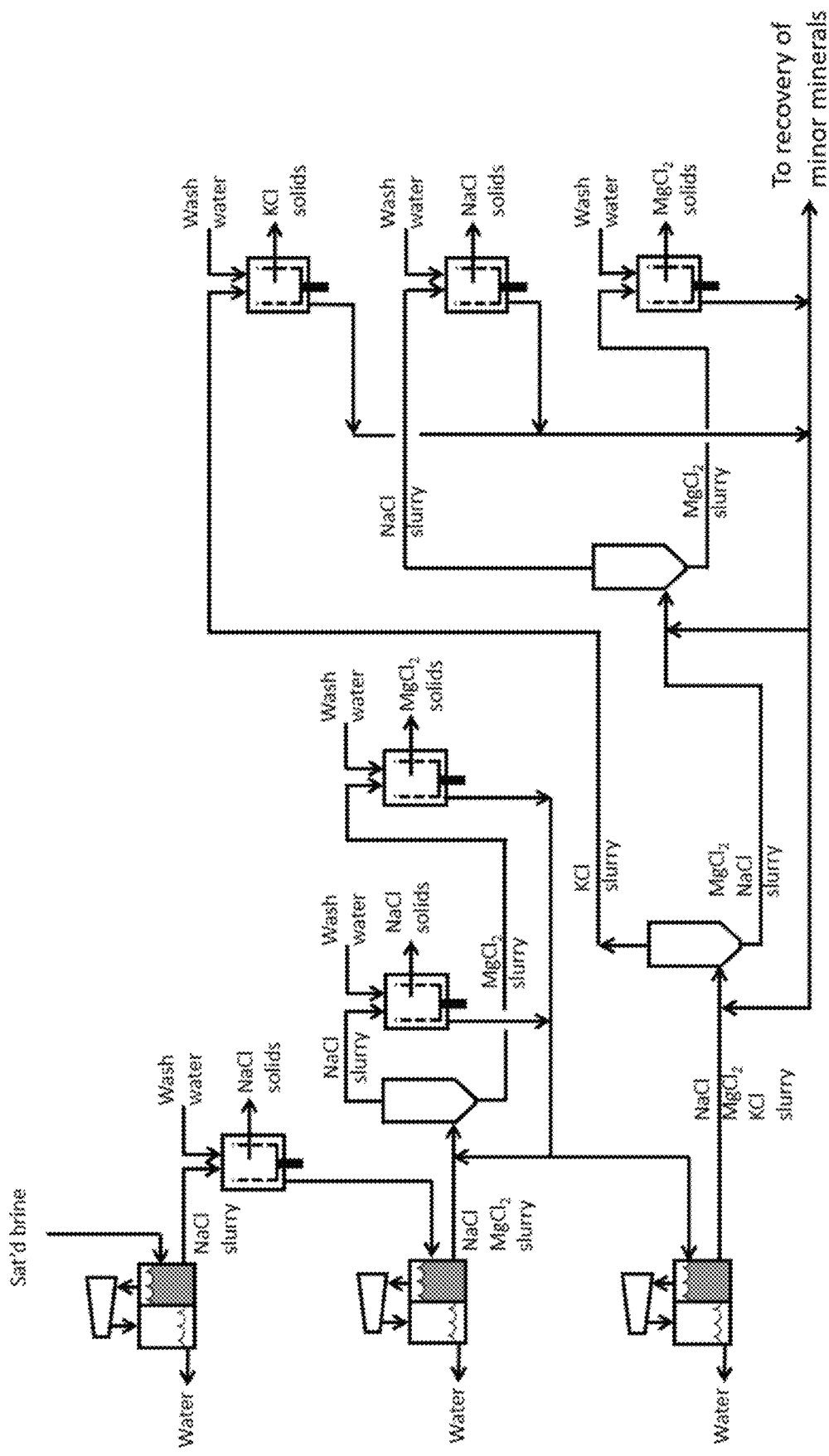
FIG. 10 shows a variation on the process described in FIG. 9.

Thus far, each process has included steps that separate the major components (NaCl, MgCl$_2$, and KCl) via crystallization. FIGS. 8, 9, and 10 shows process option for separating the major salts via crystallization. In particular configurations, the processes may serve as the crystallization processes described with reference to FIGS. 1-6. In other configurations, the crystallization process may be used in other configurations. Saturated brine from previous steps is concentrated via vapor-compression evaporation, or other suitable means.

In FIG. 8, the crystallizers operate below 117° C. where magnesium is present as MgCl$_2$·6H$_2$O and potassium is present as carnallite (KCl·MgCl$_2$·6H$_2$O) (table in FIG. 16). In FIG. 8, a plurality of vapor-compressor evaporators, basket centrifuges, and elutriators are shown. As shown on the top left of FIG. 8, with input of saturated brine into the crystallization process, water is removed to concentrate the solution to a NaCl slurry. Here, NaCl largely precipitates because of its great abundance. These initial NaCl crystals are harvested in a basket centrifuge 187 in which the mother liquid is spun off the surface of the crystals. Furthermore, to increase purity, the surface of the crystals can be washed with water.

As the crystallization continues, MgCl$_2$ will co-precipitate with NaCl. To separate these two salts, an elutriator 185 is used in which a slurry of the mixed salts is introduced into the lower end of a vertical vessel. The upward velocity is specified such that the more-dense salts settle to the bottom and the less-dense salts are swept out the top. Each of these streams is harvested in a basket centrifuge, as previously described.

As the crystallization continues, KCl will co-precipitate as carnallite, a mineral with the following formula: KCl·MgCl$_2$·6H$_2$O. Carnallite is less dense than NaCl, so carnallite exits the top of the elutriator and NaCl exits the bottom.

The carnallite is further processed by heating it to over 167° C., which causes the MgCl$_2$·6H$_2$O to melt leaving solid KCl, which is removed and washed by a basket centrifuge. The remaining MgCl$_2$ is recovered by evaporating water from the liquid, precipitating the salt, and recovering the solid in a basket centrifuge.

While a number of stages are shown in FIG. 8, after reviewing this configuration one of ordinary skill in the art will recognize more or less stages can be used in other configurations.

FIG. 9 shows a high-temperature crystallization process in which each crystallizer operates above 167° C., which ensure both $MgCl_2 \cdot 6H_2O$ and $KCl \cdot MgCl_2 \cdot 6H_2O$ have melted. In this case, the precipitates in the crystallizers are NaCl, $MgCl_2$, and KCl, each of which can be separated directly in the basket centrifuges. In the third crystallizer, all three salts are present, so two elutriators are required. In FIG. 9, the first elutriator operates with a high upward velocity so that both NaCl and KCl are swept out the top; the second elutriator separates them.

FIG. 10 shows a process similar to that shown in FIG. 9, except that the first elutriator operates with a lower velocity so that only KCl is swept out the top. The two heavier components ($MgCl_2$) and NaCl sink to the bottom. They are separated in the second elutriator.

Figure 11B:
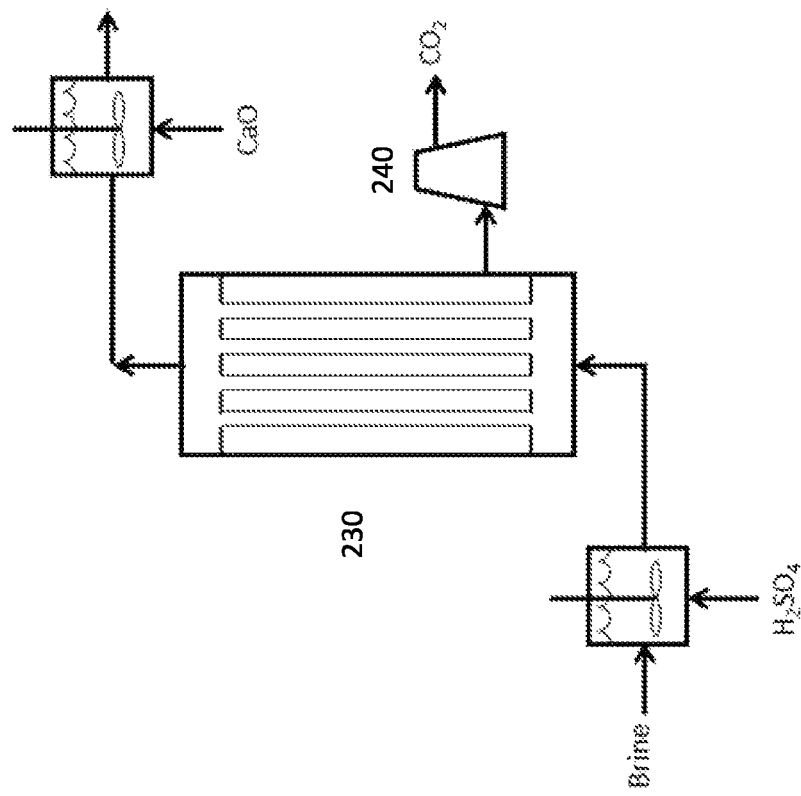
FIGS. 11A and 11B show means for stripping carbonates and bicarbonates from the brine.
Figure 11A:
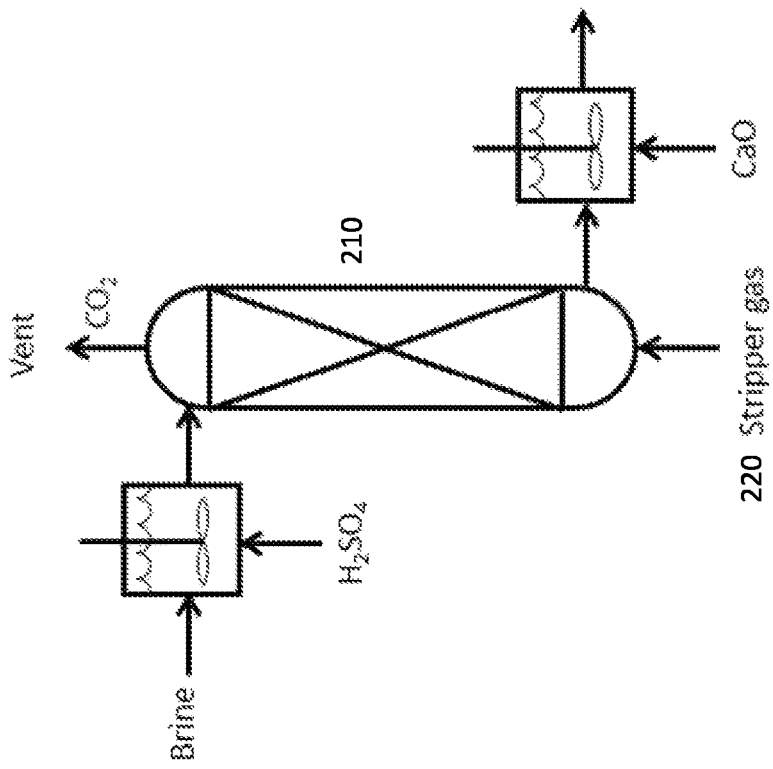

FIGS. 11a-11b show methods for removing bicarbonates and carbonates from brine. In particular configurations, the processes may serve as the carbon dioxide removal processes described with reference to FIGS. 1-6. In other configurations, the carbon dioxide removal processes may be used with other configurations. Carbonates tend to have low solubility, like hydroxide, so their removal helps ensure salts are soluble. Removal of carbonates is achieved by lowering the pH below about 4.0, which shifts the equilibrium towards carbonic acid. Carbonic acid dissociates as follows:

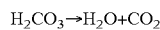
$H_2CO_3 \rightarrow H_2O + CO_2$

The carbon dioxide can be stripped from the aqueous solution. FIG. 11a shows a packed column 210 where stripping gas 220 purges the $CO_2$ as the liquid flows countercurrently. FIG. 11b shows an alternative embodiment where the aqueous solution flows through hollow membranes 230. A vacuum 240 on the exterior of the membranes removes carbon dioxide from the liquid. Such systems are sold by 3M as Liqui-Cel™.

REFERENCES 1. https://en.wikipedia.org/wiki/Magnesium_chloride
2. https://en.wikipedia.org/wiki.Carnallite
3. https://en.wikipedia.org/wiki/Potassium_chloride
4. https://en.wikipedia.org/wiki/Sodium_chloride
5. Emons, H. H., Fanghänel, T. Thermal decomposition of carnallite (KCl·MgCl2·6H2O)-comparison of experimental results and phase equilibria. Journal of Thermal Analysis 35, 2161-2167 (1989). https://doi.org/10.1007/BF01911881
6. https://.en.wikipedia.org/wiki/Crown_ether
7. https://assets.thermofisher.com/TFS-Assets/CMD/Application-Notes/AN-1144-IC-Lithium-Hyroxide-AN71807-EN.pdf
8. https://www.nrcresearchpress.com/doi/pdfplus/10.1139/v51-043

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for separating a brine solution, the method comprising:
removing water from a brine solution to yield water and a concentrated salt solution;
crystallizing chloride salts from the concentrated salt solution; and
separating hydroxides from a portion of the concentrated salt solution by adding sodium hydroxide, converting the metal hydroxides to a soluble chloride solution, and processing the soluble chloride solution with ion exchange chromatography to separate cations from the soluble chloride solution.

2. The method of claim 1, wherein:
the removing of water from the brine solution is performed at a source of the brine solution and the crystallizing is performed at a remote location from the source of the brine solution.

3. The method of claim 2, wherein:
the removing of the water from the brine solution is performed at a well site and the crystalizing is performed at a processing facility that handles brines solutions from multiple well sites.

4. The method of claim 1, further comprising:
removing sulfates and calcium from the concentrated salt solution prior to the crystallizing.

5. The method of claim 1, further comprising:
removing carbonates from the concentrated salt solution prior to the crystallizing.

6. The method of claim 1, wherein the removing of the water is at least partially performed using vapor compression evaporation.

7. The method of claim 6, wherein the vapor compression evaporation has multiple stages.

8. The method of claim 1, wherein the crystallizing chloride salts from the concentrated salt solution yields bittern in addition to the chloride salts, further comprising:
processing the bittern with ion exchange chromatography to separate cations from the bittern.

9. The method of claim 1, wherein:
the crystallizing of the chloride salts yields sodium chloride salts at operations below 117 degrees Celsisus.

10. The method of claim 1, wherein:
the crystallizing of the chloride salts is carried out by a plurality of crystallizers that yield sodium chloride, potassium chloride, and magnesium chloride.

11. The method of claim 10, wherein:
the sodium chloride, potassium chloride, and magnesium chloride are yielded in different stages of the processing by the crystallizers, and the magnesium chloride is yielded in a stage of processing before a stage that yields the potassium chloride and after a stage that yields sodium chloride.

12. A method of separation of a brine solution, the method comprising:
removing water from a brine solution to yield water and a concentrated salt solution;
separating oil from either the brine solution or the concentrated salt solution;
removing salts from the concentrated salt solution; and
separating hydroxides from a portion of the concentrated salt solution by adding sodium hydroxide, converting the metal hydroxides to a soluble chloride solution, and processing the soluble chloride solution with ion exchange chromatography to separate cations from the soluble chloride solution.

13. The method of claim 12, wherein the oil is separated using electrocoagulation.

14. The method of claim 12, wherein the oil is separated using a physical process.

15. The method of claim 12, wherein the oil is separated as part of a sludge solution, further comprising:
separating the oil from metal hydroxides.

16. The method of claim 15, wherein the oil is separated by washing the sludge solution with a volatile solvent.

17. A method for separating a brine solution, the method comprising:
removing water from a brine solution to yield water and a concentrated salt solution;
crystallizing, with a plurality of crystallizers, chloride salts from the concentrated salt solution, at least two of the plurality of crystallizers yielding a principal chloride salt, the principal chloride salt from each of the at least two of the plurality of crystallizers different than the other of the at least two of the plurality of crystallizers; and
processing bittern from the crystallizers with ion exchange chromatography to separate cations from the bittern.

18. The method of claim 17, wherein the principal chloride salts for the at least two of the plurality of crystallizers are selected from the group consisting of sodium chloride, potassium chloride, and magnesium chloride.

19. The method of claim 17, further comprising:
removing sulfates and calcium from the concentrated salt solution prior to the crystallizing.

20. The method of claim 17, further comprising:
removing carbonates from the concentrated salt solution prior to the crystallizing.

21. The method of claim 17, further comprising:
separating oil from either the brine solution or the concentrated salt solution.

22. The method of claim 21, further comprising:
separating hydroxides from either a portion of the concentrated brine solution or from a sludge when the oil is removed as part of a sludge.

23. The method of claim 17, wherein:
the removing of water from the brine solution is performed at a source of the brine solution and the crystalizing is performed at a remote location from the source of the brine solution.

24. The method of claim 17, wherein:
the removing of the brine solution is performed at a well site and the crystalizing is performed at a processing facility that handles brines solutions from multiple well sites.

25. The method of claim 17, wherein:
the crystallizers yield sodium chloride, potassium chloride, and magnesium chloride separately.

26. The method of claim 25, wherein:
the sodium chloride, potassium chloride, and magnesium chloride are yielded in different stages of the processing by the crystallizers, and the magnesium chloride is yielded in a stage of processing before a stage that yields the potassium chloride and after a stage that yields sodium chloride.

* * * * *